(12) United States Patent
Takagi

(10) Patent No.: US 11,860,522 B2
(45) Date of Patent: Jan. 2, 2024

(54) LIGHT SOURCE APPARATUS AND PROJECTOR

(71) Applicant: SEIKO EPSON CORPORATION, Tokyo (JP)

(72) Inventor: Kunihiko Takagi, Okaya (JP)

(73) Assignee: SEIKO EPSON CORPORATION, Tokyo (JP)

(*) Notice: Subject to any disclaimer, the term of this patent is extended or adjusted under 35 U.S.C. 154(b) by 111 days.

(21) Appl. No.: 17/697,260

(22) Filed: Mar. 17, 2022

(65) Prior Publication Data

US 2022/0299853 A1    Sep. 22, 2022

(30) Foreign Application Priority Data

Mar. 17, 2021  (JP) ................................. 2021-043203

(51) Int. Cl.
    *G03B 21/20*      (2006.01)
(52) U.S. Cl.
    CPC ......... *G03B 21/204* (2013.01); *G03B 21/208* (2013.01)
(58) Field of Classification Search
    None
    See application file for complete search history.

(56) References Cited

U.S. PATENT DOCUMENTS

| 9,769,436 | B2 | 9/2017 | Fukano |
| 9,823,558 | B2 | 11/2017 | Akiyama |
| 9,989,237 | B2 | 6/2018 | Takada et al. |
| 10,359,693 | B2 | 7/2019 | Takagi |
| 2015/0378249 | A1 | 12/2015 | Akiyama |
| 2016/0182869 | A1 | 6/2016 | Fukano |
| 2018/0073716 | A1 | 3/2018 | Takada et al. |
| 2018/0292740 | A1 | 10/2018 | Takagi |
| 2020/0073218 | A1* | 3/2020 | Yamamoto ........... G03B 21/204 |

FOREIGN PATENT DOCUMENTS

| JP | 2016-009158 A | 1/2016 |
| JP | 2016-118653 A | 6/2016 |
| JP | 2016-189440 A | 11/2016 |
| JP | 2018-180107 A | 11/2018 |
| JP | 2018-190664 A | 11/2018 |

* cited by examiner

*Primary Examiner* — Bao-Luan Q Le
*Assistant Examiner* — Danell L Owens
(74) *Attorney, Agent, or Firm* — Dority & Manning, P.A.

(57) ABSTRACT

A light source apparatus includes a light source configured to emit first light, a wavelength converter configured to convert the first light into second light, an optical element disposed in an optical path of the first light to be incident on the wavelength converter, a light collector configured to collect the first light emitted from the optical element toward the wavelength converter, and a driver configured to rotate the optical element and the light collector around a rotation axis parallel to a first optical axis of the first light. The optical element has a first surface on which the first light is incident and a second surface via which the first light exits. The first light emitted from the light collector is incident on the wavelength converter along the second optical axis. The first optical axis and the second optical axis are shifted from each other.

10 Claims, 5 Drawing Sheets

LIGHT SOURCE APPARATUS AND PROJECTOR

The present application is based on, and claims priority from JP Application Serial Number 2021-043203, filed Mar. 17, 2021, the disclosure of which is hereby incorporated by reference herein in its entirety.

BACKGROUND

1. Technical Field

The present disclosure relates to a light source apparatus and a projector.

2. Related Art

As a light source apparatus for projectors, there is a known light source apparatus including a laser light source and a phosphor (see JP-A-2018-180107 and JP-A-2018-190664, for example).

The light source apparatus described in JP-A-2018-180107 includes a phosphor layer, a substrate that supports the phosphor layer, and a support member that is thermally coupled to the substrate. The substrate, part of a support surface of which supports the phosphor layer is thermally coupled to the support member, dissipates heat of the phosphor layer via the substrate and the support member.

In the light source apparatus described in JP-A-2018-180107, excitation light keeps being incident on the same location in the phosphor layer. The excitation light incident position therefore tends to have a high temperature. When the temperature of the phosphor layer rises, the efficiency of the conversion from the excitation light to fluorescence in the phosphor layer lowers in some cases.

In contrast, the light source apparatus described in JP-A-2018-190664, in which the angle of a plate-shaped optical member on which excitation light is incident is changed, or a light collection optical system that collects the excitation light at a phosphor layer is moved, changes the position where the excitation light is collected at the phosphor layer. The configuration described above keeps the excitation light from being incident on the same location in the phosphor layer.

In the light source apparatus described in JP-A-2018-190664, however, the excitation light incident on the phosphor layer inclines with respect to the optical axis of the light collection optical system or is separate from the optical axis of the light collection optical system. The excitation light incident on the phosphor layer via the light collection optical system therefore undesirably spreads over a wide excitation light incident range in the phosphor layer, resulting in a wide range over which the fluorescence is generated. In this case, the fluorescence spreads when emitted from the phosphor layer, resulting in a problem of a large amount of fluorescence that is not collected by the light collection optical system. That is, there is a problem of a large amount of fluorescence that is not used for image formation.

SUMMARY

A light source apparatus according to a first aspect of the present disclosure includes a light source configured to emit first light having a first wavelength band, a wavelength converter configured to convert the first light into second light having a second wavelength band different from the first wavelength band, a substrate supporting the wavelength converter, an optical element disposed in an optical path of the first light to be incident on the wavelength converter, a light collector configured to collect the first light emitted from the optical element toward the wavelength converter, and a driver configured to rotate the optical element and the light collector around a rotation axis parallel to a first optical axis of the first light incident on the optical element. The optical element has a first surface on which the first light is incident along the first optical axis and a second surface via which the first light exits toward the light collector along the second optical axis. The first light emitted from the light collector is incident on the wavelength converter along the second optical axis. The first optical axis and the second optical axis are shifted from each other.

A projector according to a second aspect of the present disclosure includes the light source apparatus according to the first aspect described above, a light modulator configured to modulate light emitted from the light source apparatus, and a projection optical apparatus configured to project the light modulated by the light modulator.

DESCRIPTION OF EXEMPLARY EMBODIMENTS

First Embodiment

A first embodiment of the present disclosure will be described below with reference to the drawings.

Schematic Configuration of Projector

Figure 1:
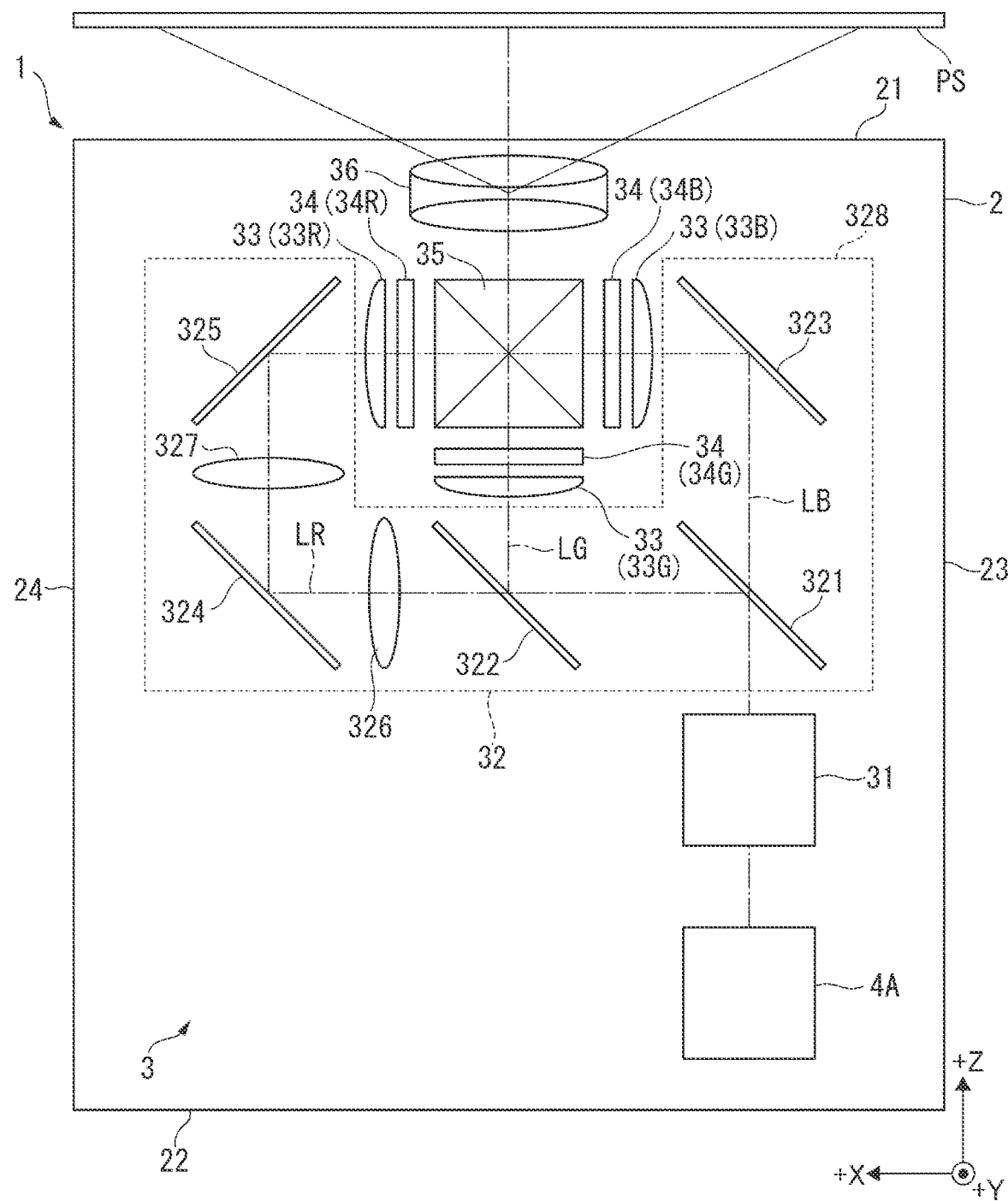
FIG. 1 is a diagrammatic view showing the configuration of a projector according to a first embodiment.

FIG. 1 is a diagrammatic view showing a schematic configuration of a projector 1 according to the present embodiment.

The projector 1 according to the present embodiment is a projection-type display apparatus that modulates light outputted from a light source apparatus 4A to form an image according to image information and enlarges and projects the formed image on a projection receiving surface PS, such as a screen. The projector 1 includes an exterior enclosure 2 and an image projection apparatus 3, as shown in FIG. 1. In addition to the components described above, the projector 1 includes, although not illustrated, a cooler that cools a cooling target in the projector 1, a controller that controls the action of the projector 1, and a power supply that supplies electronic parts that form the projector 1 with electric power.

Configuration of Exterior Enclosure

The exterior enclosure 2 forms the exterior of the projector 1. The exterior enclosure 2 accommodates the image projection apparatus 3, the cooler, the controller, and the power supply. The exterior enclosure 2 has a front surface 21, a rear surface 22, a right side surface 23, and a left side surface 24, further has a top surface and a bottom surface that are not illustrated, and is formed in a substantially box-like shape. Although not illustrated, the front surface 21 has an opening through which an image projected by a projection optical apparatus 36, which will be described later, passes.

In the following description, three directions perpendicular to one another are called directions +X, +Y, and +Z. The direction +Z is the direction from the rear surface 22 toward the front surface 21, the direction +X is the direction from the right side surface 23 toward the left side surface 24, and the direction +Y is the direction from the bottom surface toward the top surface. Although not illustrated, the direction opposite the direction +X is called a direction −X, the direction opposite the direction +Y is called a direction −Y, and the direction opposite the direction +Z is called a direction −Z.

Configuration of Image Projection Apparatus

The image projection apparatus 3 generates an image according to image information and projects the generated image. The image projection apparatus 3 includes the light source apparatus 4A, a homogenizing apparatus 31, a color separation apparatus 32, parallelizing lenses 33, light modulation apparatuses 34, a light combining apparatus 35, and a projection optical apparatus 36.

The light source apparatus 4A outputs illumination light WL to the homogenizing apparatus 31. The configuration of the light source apparatus 4A will be described later in detail.

The homogenizing apparatus 31 homogenizes the illumination light WL outputted from the light source apparatus 4A. Although not illustrated, the homogenizing apparatus 31 includes a pair of lens arrays, a polarization converter, and a superimposing lens.

The color separation apparatus 32 separates the illumination light WL incident from the homogenizing apparatus 31 into blue light LB, green light LG, and red light LR. The color separation apparatus 32 includes dichroic mirrors 321 and 322, reflection mirrors 323, 324, and 325, relay lenses 326 and 327, and an optical component enclosure 328, which accommodates the components described above.

The dichroic mirror 321 transmits the blue light LB contained in the illumination light WL and reflects the green light LG and the red light LR contained therein. The blue light LB having passed through the dichroic mirror 321 is reflected off the reflection mirror 323 and guided to one of the parallelizing lenses 33 (33B).

Out of the green light LG and the red light LR reflected off the dichroic mirror 321, the dichroic mirror 322 reflects the green light LG to guide the reflected green light LG to one of the parallelizing lenses 33 (33G), and transmits the red light LR. The red light LR is guided to one of the parallelizing lenses 33 (33R) via the relay lens 326, the reflection mirror 324, the relay lens 327, and the reflection mirror 325.

The parallelizing lenses 33 each parallelize the light incident thereon. The parallelizing lenses 33 include the parallelizing lens 33R for red light, the parallelizing lens 33G for green light, and the parallelizing lens 33B for blue light.

The light modulation apparatuses 34 modulate the light outputted from the light source apparatus 4A in accordance with image information. The light modulation apparatuses 34 include a red light modulator 34R, which modulates red light, a green light modulator 34G, which modulates green light, and a blue light modulator 34B, which modulates blue light. The light modulators 34R, 34G, and 34B each include, for example, a liquid crystal panel that modulates light incident thereon and a pair of polarizers disposed on the light incident side and the light exiting side of the liquid crystal panel.

The light combining apparatus 35 combines the red light LR, the green light LG, and the blue light LB modulated by the light modulation apparatuses 34 with one another to form an image based on the image information. In the present embodiment, the light combining apparatus 35 is formed of a cross dichroic prism and can instead be formed of a plurality of dichroic mirrors.

The projection optical apparatus 36 projects the combined image from the light combining apparatus 35 onto the projection receiving surface PS and enlarges to display an enlarged image on the projection receiving surface PS. The projection optical apparatus 36 can, for example, be a unit lens formed of a lens barrel and a plurality of lenses disposed in the lens barrel.

Configuration of Light Source Apparatus

Figure 2:
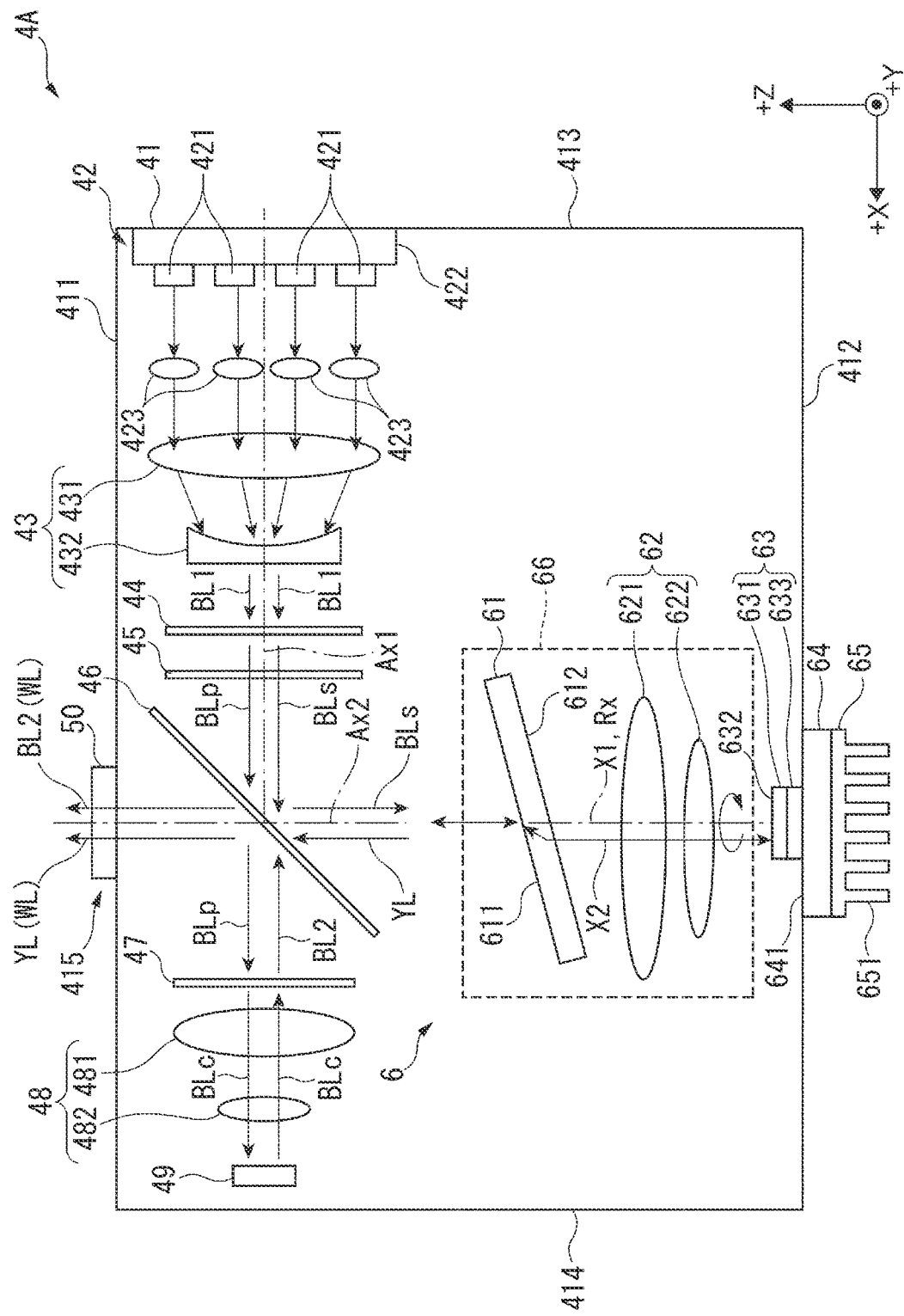
FIG. 2 is a diagrammatic view showing the configuration of a light source apparatus in the first embodiment.

FIG. 2 is a diagrammatic view showing the configuration of the light source apparatus 4A.

The light source apparatus 4A outputs the illumination light WL to the homogenizing apparatus 31 along the direction +Z. The light source apparatus 4A includes a light source enclosure 41, a light source section 42, an afocal optical element 43, a first phase retarder 44, a diffusive transmitter 45, a light separator 46, a second phase retarder 47, a light collector 48, a diffuser 49, a third phase retarder 50, and a wavelength conversion apparatus 6, as shown in FIG. 2.

Configuration of Light Source Enclosure

The light source enclosure 41 is an enclosure that dust is unlikely to enter and is formed in a substantially box-like shape. The light source enclosure 41 has a front surface 411, a rear surface 412, a right side surface 413, and a left side surface 414. In addition to the above, the light source enclosure 41 has, although not illustrated, a top surface coupled to the +Y-direction ends of the front surface 411, the rear surface 412, the right side surface 413, and the left side surface 414, and a bottom surface that coupled to the −Y-direction ends of the four surfaces.

The front surface 411 is a surface of the light source enclosure 41 via which the illumination light WL exits, and the front surface 411 is disposed on one side of the light source enclosure 41, the side facing in the direction +Z. The front surface 411 has an exit port 415, via which the illumination light WL exits.

The rear surface 412 is a surface opposite from the front surface 411 and is disposed in a position shifted in the direction −Z side from the front surface 411. A substrate 64, which will be described later, of the wavelength conversion apparatus 6 is thermally coupled to the rear surface 412.

In the light source enclosure 41, the following axes are set: an illumination optical axis Ax1 along the direction +X; and an illumination optical axis Ax2 along the direction +Z. That is, the illumination optical axis Ax1 and the illumination optical axis Ax2 intersect with each other. The optical components of the light source apparatus 4A are disposed on the illumination optical axis Ax1 or the illumination optical axis Ax2.

Specifically, the light source section 42, the afocal optical element 43, the first phase retarder 44, the diffusive transmitter 45, the light separator 46, the second phase retarder 47, the light collector 48, and the diffuser 49 are arranged on the illumination axis Ax1.

The wavelength conversion apparatus 6, the light separator 46, and the third phase retarder 50 are arranged on the illumination optical axis Ax2. That is, the light separator 46 is disposed at the intersection of the illumination optical axis Ax1 and the illumination optical axis Ax2.

Configuration of Light Source Section

The light source section 42 is fixed to the right side surface 413 and outputs light in the direction +X along the illumination optical axis Ax1. The light source section 42 includes light sources 421, a light source support substrate 422, and lenses 423.

The light sources 421 each output s-polarized blue light BL1 in the direction +X. The light sources 421 are formed of at least one solid-state light emitter. Specifically, the light sources 421 are each a semiconductor laser, and the blue light BL1 outputted by each of the light sources 421 is, for example, laser light having a peak wavelength of 440 nm.

The light source support substrate 422 supports the light sources 421 and is fixed to the right side surface 413. The light source support substrate 422 is made, for example, of metal so that the heat of the light sources 421 can be readily transmitted to the light source enclosure 41.

The lenses 423 are provided in accordance with the light sources 421, parallelizes the blue light BL1 incident from each of the light sources 421, and causes the parallelized blue light BL1 to enter the afocal optical element 43.

Configuration of Afocal Optical Element

The afocal optical element 43 is disposed in a position shifted in the direction +X from the light source section 42 and reduces the luminous flux diameter of the blue light BL1 incident from the light source section 42. The afocal optical element 43 is formed of a first lens 431, which collects a luminous flux incident thereon, and a second lens 432, which parallelizes the luminous flux collected by the first lens 431. The afocal optical element 43 may be omitted.

Configuration of First Phase Retarder

The first phase retarder 44 converts part of the blue light BL1 incident from the afocal optical element 43 into p-polarized blue light BLp. That is, the first phase retarder 44 converts the blue light BL1 incident thereon into light that is a mixture of s-polarized blue light BLs and the p-polarized blue light BLp. A pivot apparatus may be provided to cause the first phase retarder 44 to pivot around a pivotal axis extending along the illumination optical axis Ax1. In this case, the ratio between the s-polarized blue light BLs and the p-polarized blue light BLp in the luminous flux having exited out of the first phase retarder 44 can be adjusted in accordance with the angle of the pivotal movement of the first phase retarder 44.

The s-polarized light is s-polarized light with respect to the light separator 46, and the p-polarized light is p-polarized light with respect to the light separator 46.

Configuration of Diffusive Transmitter

The diffusive transmitter 45 is disposed in a position shifted in the direction +X from the first phase retarder 44 and homogenizes the illuminance distributions of the blue light BLs and the blue light BLp incident from the first phase retarder 44. The diffusive transmitter 45 can, for example, have a configuration including a hologram, a configuration in which a plurality of lenslets are arranged in a plane perpendicular to the optical axis, or a configuration in which a light passage surface is a rough surface.

The diffusive transmitter 45 may be replaced with a homogenizer optical element including a pair of multilenses.

Configuration of Light Separator

The blue light BLs and the blue light BLp are incident on the light separator 46 from the diffusive transmitter 45.

The light separator 46 corresponds to a reflector. The light separator 46 causes a first portion of the light outputted from the light sources 421 to exit toward the wavelength conversion apparatus 6 and a second portion of the light to exit toward the diffuser 49. In detail, the light separator 46 is a polarizing beam splitter that separates the s-polarized light component and the p-polarized light component contained in the light incident on the light separator 46 from each other, reflects the s-polarized light component, and transmits the p-polarized light component. The light separator 46 has color separation characteristics that cause the light separator 46 to transmit light having a predetermined wavelength and longer wavelengths irrespective of the s-polarized light component or the p-polarized light component. The light separator 46 therefore transmits the p-polarized blue light BLp out of the blue light BLs and the blue light BLp incident from the diffusive transmitter 45 to cause the blue light BLp to enter the second phase retarder 47 and reflects the s-polarized blue light BLs toward the wavelength conversion apparatus 6.

The light separator 46 may instead have the function of a half-silvered mirror that transmits part of the light incident from the diffusive transmitter 45 and reflects the remaining light and the function of a dichroic mirror that reflects the blue light BLs incident from the second phase retarder 47 and transmits fluorescence YL incident from the wavelength conversion apparatus 6. In this case, the first phase retarder 44 and the second phase retarder 47 can be omitted.

In the present specification, the s-polarized blue light BLs separated by the light separator 46 is an example of first light having a first wavelength band outputted from the light sources 421. That is, the light separator 46 reflects the first light outputted from the light sources 421 to guide the reflected first light to a wavelength converter 63.

Configuration of Second Phase Retarder

The second phase retarder 47 is disposed in a position shifted in the direction +X from the light separator 46. The second phase retarder 47 converts the blue light BLp incident in the direction +X from the light separator 46 into circularly polarized blue light BLc. The second phase retarder 47 converts the circularly polarized blue light BLc incident in the direction −X from the light collector 48 into s-polarized blue light BL2.

Configuration of Light Collector

The light collector 48 is disposed in a position shifted in the direction +X from the second phase retarder 47 and collects the blue light BLc incident from the second phase retarder 47 at the diffuser 49. The light collector 48 parallelizes the blue light BLc incident from the diffuser 49 and causes the parallelized blue light BLc to exit to the second phase retarder 47. The light collector 48 is formed of two lenses 481 and 482, but the number of lenses that forms the light collector 48 can be changed as appropriate.

Configuration of Diffuser

The diffuser 49 reflects in the direction −X the blue light BLc incident from the light collector 48 in such a way that the reflected blue light BLc diffuses at an angle of diffusion equal to the angle of diffusion of the light from the wavelength converter 63, which will be described later. The diffuser 49, for example, reflects the blue light BLc incident thereon in the Lambertian reflection scheme.

The blue light BLc reflected off the diffuser 49 passes through the light collector 48 along the direction −X and then enters the second phase retarder 47. When reflected off the diffuser 49, the blue light BLc is converted into circularly polarized light having a direction of polarization rotation opposite from the direction of the polarization rotation of the blue light BLc having passed in the direction +X through the second phase retarder 47. The blue light BLc having entered the second phase retarder 47 via the light collector 48 is therefore converted into the s-polarized blue light BL2 by the second phase retarder 47. The blue light BL2 incident on the light separator 46 from the second phase retarder 47 is reflected in the direction +Z off the light separator 46 and enters the third phase retarder 50.

Configuration of Third Phase Retarder

The third phase retarder 50 is disposed in a position shifted in the direction +Z from the light separator 46 and converts the blue light BL2 and the fluorescence YL incident from the light separator 46 into white light that is a mixture of s-polarized light and p-polarized light. The thus converted white light exits as the illumination light WL to the homogenizing apparatus 31. That is, the light outputted from the light source apparatus 4A to the homogenizing apparatus 31 is the illumination light WL, which is the mixture of the blue light BL2 and the fluorescence YL.

Configuration of Wavelength Conversion Apparatus

The wavelength conversion apparatus 6 converts the wavelength of light incident thereon and emits the light. That is, the wavelength conversion apparatus 6 outputs the fluorescence YL, which is the result of the conversion of the wavelength of the blue light BLs incident on the light separator 46.

The wavelength conversion apparatus 6 includes the following components sequentially from the side facing the light separator 46: an optical element 61; a light collector 62; a wavelength converter 63; a substrate 64; a heat dissipation member 65; and a driver 66, which rotates the optical element 61 and the light collector 62 around an axis of rotation Rx.

Configuration of Optical Element

The optical element 61 refracts the blue light BLs incident from the light separator 46 and causes the refracted blue light BLs to exit toward the light collector 62. The optical element 61 further refracts the fluorescence YL incident from the light collector 62 and causes the refracted fluorescence YL to exit toward the light separator 46.

The optical element 61 is a plate-shaped light-transmissive member and is made of glass in the present embodiment. The optical element 61 has a first surface 611 and a second surface 612 disposed on the side opposite from the first surface 611.

The first surface 611 and the second surface 612 each incline with respect to a plane perpendicular to the direction +Z. The first surface 611 and the second surface 612 are parallel to each other. The state in which the first surface 611 and the second surface 612 are parallel to each other includes a state in which the two surfaces are substantially parallel to each other.

The first surface 611 is disposed on the side facing the direction +Z. The first surface 611 is a surface on which the blue light BLs is incident from the light separator 46. The first surface 611 is also a surface via which the fluorescence YL incident from the light collector 62 exits to the light separator 46.

The blue light BLs having exited out of the light separator 46 in the direction −Z along the illumination optical axis Ax2 is incident on the first surface 611. The blue light BLs incident on the first surface 611 is refracted when the blue light BLs enters the optical element 61. The optical axis of the blue light BLs incident on the first surface 611 of the optical element 61 is hereinafter referred to as a first optical axis X1.

The second surface 612 is disposed on the side facing in the direction −Z. The second surface 612 is a surface via which the blue light BLs having traveled in the optical element 61 exits toward the light collector 62. That is, the second surface 612 is a surface via which the blue light BLs incident on the first surface 611 and refracted thereby exits in the direction −Z toward the light collector 62. The optical axis of the blue light BLs having exited via the second surface 612 is hereinafter referred to as a second optical axis X2. That is, a light exiting position on the second surface 612, the position from which the blue light BLs as the first light exits, is located on the second optical axis X2.

The second surface 612 is a surface on which the fluorescence YL is incident from the wavelength converter 63. That is, the fluorescence YL having exited out of the light collector 62 in the direction +Z is incident on the second surface 612. The fluorescence YL incident on the second surface 612 is refracted when the fluorescence YL enters the optical element 61. The fluorescence YL having traveled in the optical element 61 exits via the first surface 611 in the direction +Z toward the light separator 46. The fluorescence YL having exited via the first surface 611 in the direction +Z travels along the optical path of the blue light BLs incident on the first surface 611 in the direction opposite from the direction in which the blue light BLs travels.

Configuration of Light Collector

The light collector 62 is disposed in a position shifted in the direction −Z from the optical element 61. That is, the light collector 62 is disposed between the optical element 61 and the wavelength converter 63 in the direction +Z.

The light collector 62 collects the blue light BLs incident from the optical element 61 at the wavelength converter 63. The light collector 62 also parallelizes the fluorescence YL incident from the wavelength converter 63 and causes the parallelized fluorescence YL to exit to the optical element 61.

The light collector 62 includes a first lens 621 disposed on the side facing in the direction +Z and a second lens 622 on the side facing in the direction −Z. The number of lenses that form the light collector 62 may, however, be one or three or more.

The thus configured light collector 62 is so disposed that the optical axis of the light collector 62 coincides with the second optical axis X2. The focal point of the light collector 62 is therefore present on the second optical axis X2. The state in which the optical axis of the light collector 62 coincides with the second optical axis X2 includes a state in which the optical axes substantially coincide with each other.

Configuration of Wavelength Converter

The wavelength converter 63 converts the first light having the first wavelength band into second light having a second wavelength band different from the first wavelength band. That is, the wavelength converter 63 converts the wavelength of the blue light BLs incident from the light collector 62 and emits the fluorescence YL, which is converted light resulting from the conversion. In the present embodiment, the wavelength converter 63 is a reflective wavelength converter that emits the fluorescence YL toward the side on which the blue light BLs is incident.

The wavelength converter 63 includes a wavelength conversion layer 631 and a reflection layer 633.

The wavelength conversion layer 631 contains a phosphor that generates the fluorescence YL having wavelengths longer than the wavelength of the blue light BLs. The fluorescence YL is, for example, light having a peak wavelength that falls within a range from 500 to 700 nm and contains green light and red light. The fluorescence YL is an example of the second light having the second wavelength band different from the first wavelength band. A surface of the wavelength conversion layer 631, the surface facing in the direction +Z, is a light incident surface 632, on which the blue light BLs is incident. That is, the wavelength converter 63 has the light incident surface 632, on which the blue light BLs is incident.

The light incident surface 632 intersects with the first optical axis X1 at the center of the light incident surface 632 when viewed in the direction +Z. That is, the axis of rotation Rx, which coincides with the first optical axis X1, intersects with the light incident surface 632 at the center thereof when viewed in the direction +Z. The state in which the first optical axis X1 and the axis of rotation Rx intersect with the light incident surface 632 at the center thereof includes a state in which the two axes intersect with the light incident surface 632 at a point close to the center thereof.

On the other hand, the position where the second optical axis X2 intersects with the light incident surface 632 is separate from the position where the first optical axis X1 intersects with the light incident surface 632. That is, the first optical axis X1 and the second optical axis X2 are separate from each other at the light incident surface 632. The position where the second optical axis X2 intersects with the light incident surface 632 is the position where the blue light BLs is incident on the light incident surface 632.

In the present embodiment, the wavelength conversion layer 631 is formed substantially in a circular shape when viewed in the direction +Z, but not necessarily. The wavelength conversion layer 631 may be formed substantially in a rectangular shape or an annular shape when viewed in the direction +Z.

The reflection layer 633 is provided on the opposite side of the wavelength conversion layer 631 from the side on which the blue light BLs is incident. That is, the reflection layer 633 is provided in a position shifted in the direction −Z from the wavelength conversion layer 631. The reflection layer 633 reflects in the direction +Z the light incident thereon from the wavelength conversion layer 631. The reflection layer 633 is also a portion of the wavelength converter 63, the portion where the wavelength converter 63 is coupled to the substrate 64.

The fluorescence YL emitted from the wavelength converter 63 in the direction +Z enters the light collector 62. The fluorescence YL having entered the light collector 62 is parallelized by the light collector 62 and is incident on the second surface 612 of the optical element 61. The fluorescence YL incident on the second surface 612 is refracted by the optical element 61 and exits in the direction +Z via the first surface 611. The fluorescence YL having exited via the first surface 611 travels along the first optical axis X1, is incident on the light separator 46, passes through the light separator 46, and enters the third phase retarder 50.

Configurations of Substrate and Heat Dissipation Member

The substrate 64 supports the wavelength converter 63. The substrate 64 has a support surface 641, which supports the wavelength converter 63, and the support surface 641 is thermally coupled to the outer surface of the rear surface 412. The substrate 64 is made of a material, such as metal, so that heat of the wavelength converter 63 can be readily transmitted.

The heat dissipation member 65 is provided at the opposite surface of the substrate 64 from the wavelength converter 63. The heat dissipation member 65 dissipates the heat of the wavelength converter 63 transmitted from the substrate 64 to the space outside the light source enclosure 41. The heat dissipation member 65 has a plurality of fins 651, and a cooling gas circulated by the cooler flows through the gaps between the plurality of fins 651. The plurality of fins 651 dissipate the heat of the wavelength converter 63 by transmitting the heat of the wavelength converter 63 to the cooling gas.

Configuration of Driver

The driver 66 rotates the optical element 61 and the light collector 62 around the axis of rotation Rx. In detail, the driver 66 rotates the optical element 61 and the light collector 62 as a unit around the axis of rotation Rx. The frequency of the rotation of the optical element 61 and the light collector 62 rotated by the driver 66 can be set at any value. When the frequency is 60 Hz or higher, a user is unlikely to recognize flickers of an image.

The axis of rotation Rx coincides with the first optical axis X1, as described above. The state in which the axis of rotation Rx coincides with the first optical axis X1 includes a state in which the axis of rotation Rx substantially coincides with the first optical axis X1.

The driver 66 can be formed, for example, of a hollow motor that accommodates the optical element 61 and the light collector 62. A situation in which the blue light BLs and the fluorescence YL passing through the optical element 61 and the light collector 62 are blocked by the driver 66 can therefore be avoided. The configuration described above is, however, not necessarily employed, and the driver 66 may include a holding member that holds the optical element 61 and the light collector 62 and rotate the holding member around the axis of rotation Rx.

Position where Blue Light is Incident on Wavelength Converter

Figure 3:
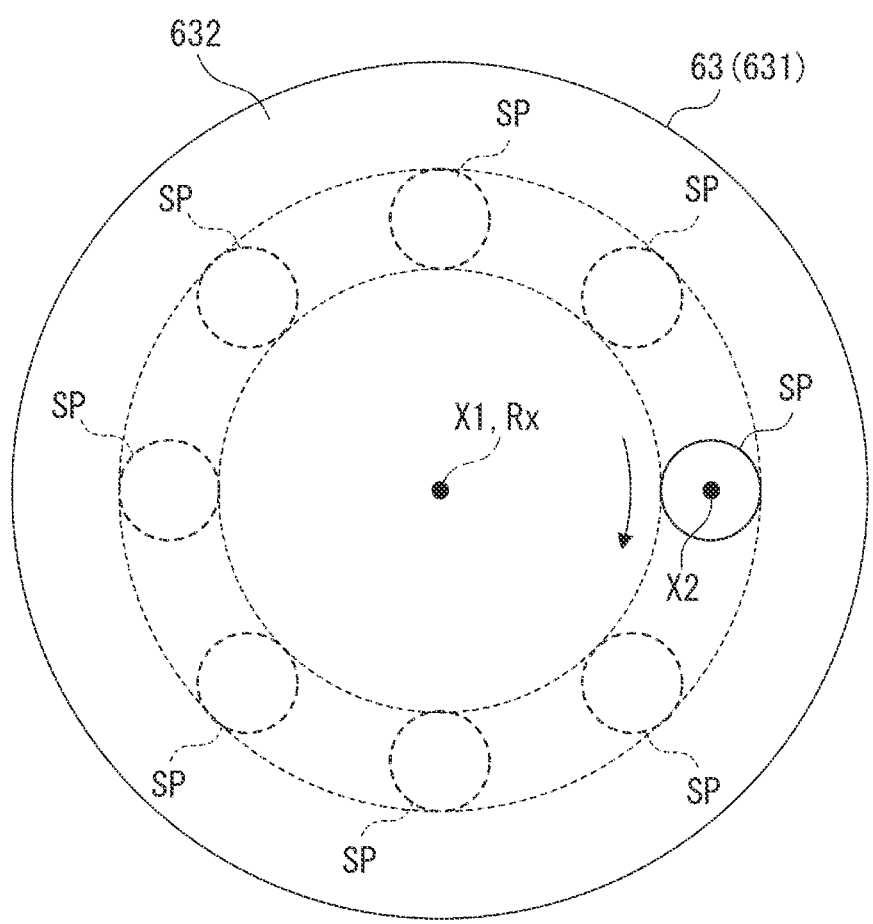
FIG. 3 is a plan view showing a light incident position where blue light is incident on a light incident surface of a wavelength converter in the first embodiment.

FIG. 3 is a plan view viewed in the direction +Z and showing a light incident position SP, where the blue light BL1 is incident on the light incident surface 632 of the wavelength converter 63.

The first optical axis X1 is the optical axis of the blue light BLs incident on the optical element 61. The second optical axis X2 is the optical axis of the blue light BLs that is refracted by the optical element 61 and exits via the second surface 612. The optical axis of the light collector 62 coincides with the second optical axis X2, and the focal point of the light collector 62 is present on the second optical axis X2. The first optical axis X1, which coincides with the axis of rotation Rx, and the second optical axis X2 are separate from each other at the light incident surface 632, as shown in FIG. 3. The light incident position SP, where the blue light BLs is incident on the light incident surface 632, corresponds to the intersection where the second optical axis X2 intersects with the light incident surface 632.

When the driver 66 rotates the optical element 61 and the light collector 62 around the axis of rotation Rx, the light incident position SP is located on a circular trajectory around the first optical axis X1. That is, the light incident position SP continuously moves with time on the light incident surface 632 along the circumferential direction around the intersection where the first optical axis X1 intersects with the light incident surface 632.

As described above, the configuration in which the light incident position SP, where the blue light BLs, which is the excitation light, is incident, continuously changes with time on the light incident surface 632 can avoid the continuous local incidence of the blue light BLs on the light incident surface 632. The situation in which the temperature of the light incident surface 632 locally rises can therefore be avoided, whereby a decrease in the conversion efficiency at which the wavelength converter 63 converts the blue light BLs into the fluorescence YL can be suppressed. Furthermore, since the focal point of the light collector 62 is located on the second optical axis X2, the blue light BLs is focused at the intersection of the second optical axis X2 and the light incident surface 632, so that the range over which the blue light BLs is incident on the light incident surface 632 can be reduced. The range over which the fluorescence YL is emitted from the wavelength converter 63 can therefore be reduced, whereby the fluorescence YL that can be used by an optical system downstream of the wavelength converter 63 can be increased.

Effects of First Embodiment

The projector 1 according to the present embodiment described above provides the following effects.

The projector 1 includes the light source apparatus 4A, the light modulation apparatuses 34, which modulate the illumination light WL outputted from the light source apparatus 4A to form an image, and the projection optical apparatus 36, which projects the image formed by the light modulation apparatuses 34.

The light source apparatus 4A includes the light sources 421, the optical element 61, the light collector 62, the wavelength converter 63, the substrate 64, and the driver 66. The light sources 421 output the blue light BLs. The blue light BLs corresponds to the first light having the first wavelength band. The wavelength converter 63 converts the blue light BLs into the fluorescence YL. The wavelength converter 63 has the light incident surface 632, on which the blue light BLs is incident. The fluorescence YL corresponds to the second light having the second wavelength band different from the first wavelength band. The substrate 64 supports the wavelength converter 63. The optical element 61 is provided in the optical path of blue light BLs outputted from the light sources 421 and incident on the wavelength converter 63. The light collector 62 collects the blue light BLs having exited out of the optical element 61 at the wavelength converter 63. The driver 66 rotates the optical element 61 and the light collector 62 around the axis of rotation Rx parallel to the first optical axis X1 of the blue light BLs incident on the optical element 61. The optical element 61 has the first surface 611, on which the blue light BLs is incident, and the second surface 612, via which the blue light BLs exits toward the light collector 62. The light incident position SP, where the blue light BLs is incident on the first surface 611, is present on the first optical axis X1. The light exiting position on the second surface 612, the position from which the blue light BLs exits, and the focal point of the light collector 62 are present on the second optical axis X2 parallel to the first optical axis X1. The first optical axis X1 and the second optical axis X2 are separate from each other at the light incident surface 632.

The configuration described above, in which the driver 66 rotates the optical element 61 and the light collector 62 around the axis of rotation Rx, allows movement of the light incident position SP, where the blue light BLs is incident on the intersection where the second optical axis X2 intersects with the light incident surface 632 of the wavelength converter 63. In this process, the focal point of the light collector 62 is present on the second optical axis X2, so that the blue light BLs is focused at the intersection where the second optical axis X2 intersects with the light incident surface 632. The range over which the blue light BLs is incident on the incident surface 632 can therefore be reduced, whereby the range over which the fluorescence YL is emitted from the wavelength converter 63 can be reduced. As a result, the fluorescence YL that can be used by an optical system downstream of the wavelength converter 63 can be increased. In addition to the above, since the continuous local incidence of the blue light BLs on the wavelength converter 63 can be avoided, the situation in which the temperature of the wavelength converter 63 locally rises can be suppressed. A decrease in the conversion efficiency at which the wavelength converter 63 converts the blue light BLs into the fluorescence YL can therefore be suppressed, whereby the efficiency at which the fluorescence YL is extracted from the wavelength converter 63 can be increased.

In the light source apparatus 4A, the axis of rotation Rx coincides with the first optical axis X1.

Consider now a case where the axis of rotation Rx around which the optical element 61 and the light collector 62 are rotated does not coincide with the first optical axis X1. When the optical element 61 and the light collector 62 are rotated by the driver 66, the trajectory of the light incident position SP, where the blue light BLs is incident on the light incident surface 632, is located outside the trajectory, around the axis of rotation Rx, of the portion where the first optical axis X1 intersects with the light incident surface 632. That is, the trajectory of the light incident position SP is concentric with and disposed outside the trajectory of the portion where the first optical axis X1 intersects with the light incident surface 632. In this case, since the trajectory of the light incident position SP, where the blue light BLs is incident, has a relatively large diameter, the wavelength converter 63 tends to be large to avoid loss of the blue light BLs incident on the wavelength converter 63.

In contrast, when the axis of rotation Rx coincides with the first optical axis X1, the diameter of the trajectory of the light incident position SP, where the blue light BLs is incident on the light incident surface 632, can be smaller than the diameter in the case where the axis of rotation Rx does not coincide with the first optical axis X1. The size of the wavelength converter 63 can therefore be reduced.

In the light source apparatus 4A, the first surface 611 inclines with respect to a plane perpendicular to the first optical axis X1, and the first surface 611 and the second surface 612 are parallel to each other.

According to the configuration described above, the blue light BLs incident on the first surface 611 can be refracted by the optical element 61. The light incident position SP, where the blue light BLs is incident on the light incident surface 632, can therefore be changed when the driver 66 rotates the optical element 61 and the light collector 62.

Furthermore, since the first surface 611 and the second surface 612 are parallel to each other, the light exiting position from which the blue light BLs exits via the second surface 612 can be readily grasped. The light collector 62, the focal point of which is located on the second optical axis X2, can therefore be readily disposed.

Second Embodiment

A second embodiment of the present disclosure will next be described.

The projector according to the present embodiment has the same configuration as that of the projector 1 according to the first embodiment but differs therefrom in terms of the configuration of the light source apparatus. Specifically, the light source apparatus provided in the projector according to the present embodiment further includes an afocal optical element in addition to the configuration of the light source apparatus 4A according to the first embodiment. In the following description, portions that are the same or substantially the same as the portions having been already described have the same reference characters and will not be described.

Configuration of Light Source Apparatus

Figure 4:
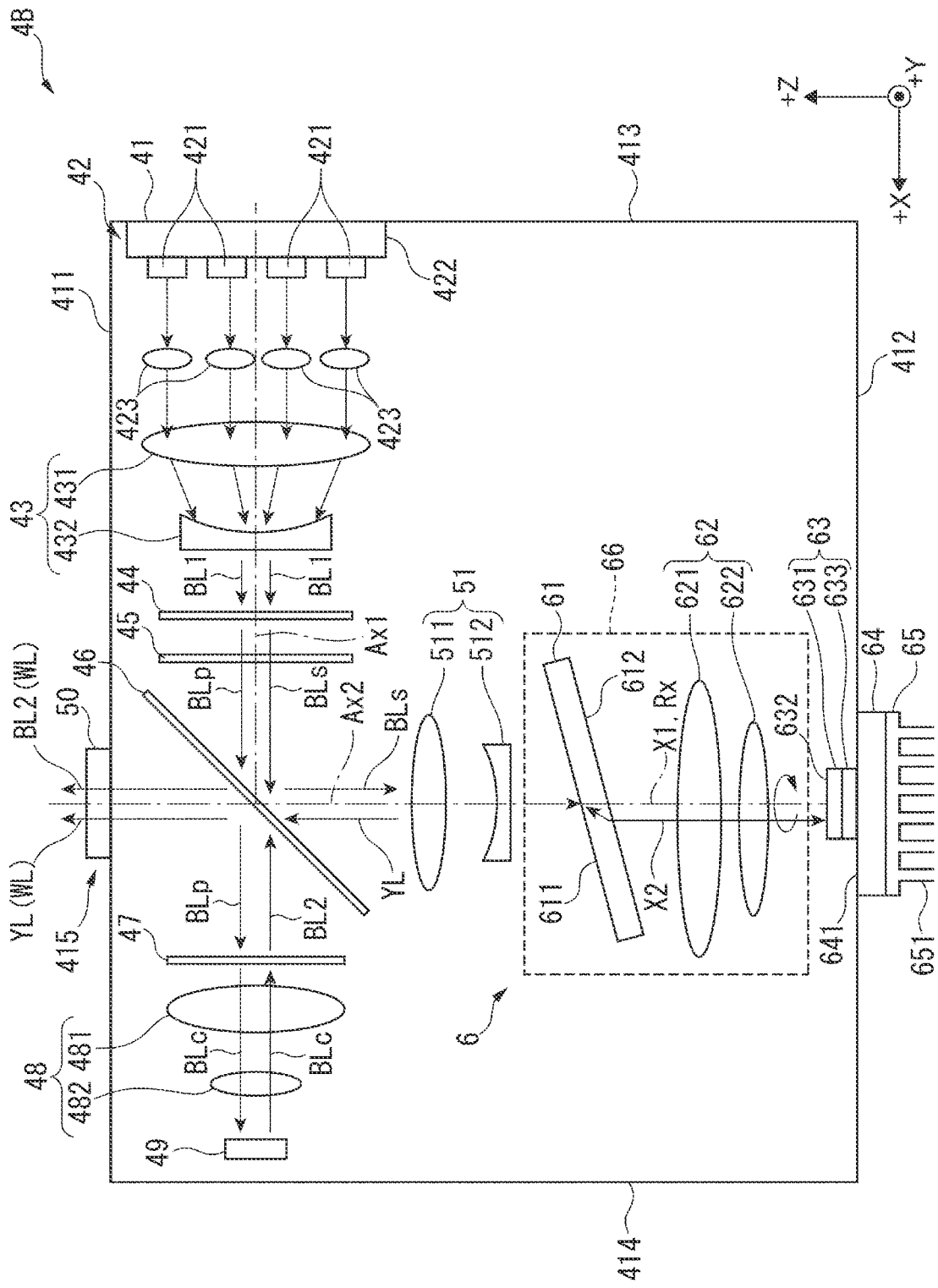
FIG. 4 is a diagrammatic view showing the light source apparatus according to a second embodiment.

FIG. 4 is a diagrammatic view showing a light source apparatus 4B according to the present embodiment.

The projector according to the present embodiment has the same configuration and function as those of the projector 1 according to the first embodiment except that the light source apparatus 4A according to the first embodiment is replaced with the light source apparatus 4B shown in FIG. 4.

The light source apparatus 4B has the same configuration and function as the light source apparatus 4A except that an afocal optical element 51 is further provided.

The afocal optical element 51 is disposed on the illumination optical axis Ax2 between the light separator 46 and the wavelength conversion apparatus 6. That is, the afocal optical element 51 is provided on a side of the optical element 61, the side on which the blue light BLs is incident, in the optical path of the blue light BLs to be incident on the wavelength converter 63. The afocal optical element 51 reduces the luminous flux diameter of the blue light BLs having exited out of the light separator 46 and to be incident on the optical element 61 and parallelizes the blue light BLs. The afocal optical element 51 further increases the luminous flux diameter of the fluorescence YL incident from the optical element 61 and parallelizes the fluorescence YL.

The afocal optical element 51 has a first lens 511 provided on the side facing in the direction +Z and a second lens 512 provided on the side facing in the direction −Z.

The first lens 511 collects the blue light BLs incident from the light separator 46. The second lens 512 parallelizes the blue light BLs collected by the first lens 511 and causes the collected blue light BLs to exit in the direction −Z. The blue light BLs having exited out of the second lens 512 enters the optical element 61 of the wavelength conversion apparatus 6.

The second lens 512 increases the luminous flux diameter of the fluorescence YL incident from the optical element 61. The first lens 511 parallelizes the fluorescence YL incident from the second lens 512. The fluorescence YL having exited out of the first lens 511 in the direction +Z is incident on the light separator 46.

Effects of Second Embodiment

The projector according to the present embodiment described above provides the effects below as well as the same effects provided by the projector 1 according to the first embodiment.

The light source apparatus 4B includes the afocal optical element 51, and the afocal optical element 51 is provided on a side of the optical element 61, the side on which the blue light BLs is incident, in the optical path of the blue light BLs to be incident on the wavelength converter 63, reduces the luminous flux diameter of the blue light BLs, and parallelizes the blue light BLs.

According to the configuration described above, the afocal optical element 51 can reduce the luminous flux diameter of the blue light BLs to be incident on the optical element 61. The sizes of the optical element 61, the light collector 62, and the wavelength converter 63 can thus be reduced. The size of the light source apparatus 4B can therefore be reduced.

Third Embodiment

A third embodiment of the present disclosure will next be described.

The projector according to the present embodiment has the same configuration as that of the projector according to the first embodiment but differs therefrom in terms of the configuration of the light source apparatus. Specifically, the light source apparatus provided in the projector according to the present embodiment further includes an afocal optical element in addition to the configuration of the light source apparatus 4A according to the first embodiment. Furthermore, the position of the afocal optical element in the present embodiment differs from the position of the afocal optical element in the light source apparatus 4B according to the second embodiment. In the following description, portions that are the same or substantially the same as the portions having been already described have the same reference characters and will not be described.

Figure 5:
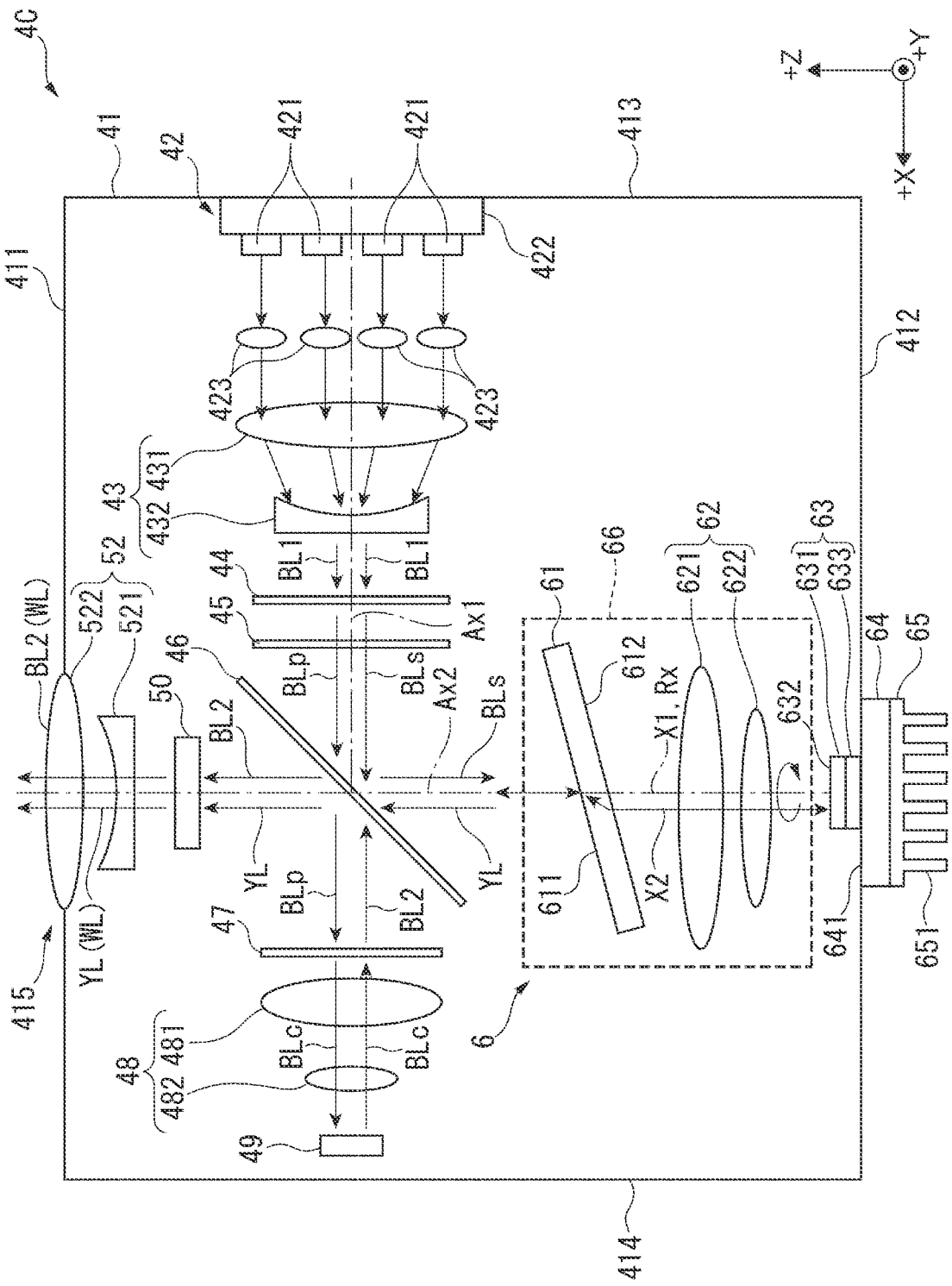
FIG. 5 is a diagrammatic view showing the light source apparatus according to a third embodiment.

FIG. 5 is a diagrammatic view showing the configuration of a light source apparatus 4C according to the present embodiment.

The projector according to the present embodiment has the same configuration and function as those of the projector 1 according to the first embodiment except that the light source apparatus 4A according to the first embodiment is replaced with the light source apparatus 4C shown in FIG. 5.

The light source apparatus 4C has the same configuration and function as the light source apparatus 4A except that an afocal optical element 52 is further provided.

The afocal optical element 52 is disposed in the light source enclosure 41. Specifically, the afocal optical element 52 is disposed in the illumination optical axis Ax2 on a side of the third phase retarder 50, the side toward which the illumination light WL exits. That is, the afocal optical element 52 is disposed between the third phase retarder 50 and the homogenizing apparatus 31.

The afocal optical element 52 increases the luminous flux diameter of the illumination light WL incident from the third phase retarder 50, parallelizes the illumination light WL having the increased diameter, and causes the illumination light WL to exit. That is, the afocal optical element 52 increases the luminous flux diameter of the fluorescence YL emitted from the wavelength converter 63 and parallelizes the fluorescence YL having the increased diameter.

The afocal optical element 52 includes a first lens 521 and a second lens 522. The first lens 521 is disposed on the side facing in the direction −Z and increase the diameter of the light incident from the third phase retarder 50. The second lens 522 parallelizes the light incident in the direction +Z from the first lens 521.

The afocal optical element 52 may instead be provided in the illumination optical axis Ax2 between the light separator 46 and the third phase retarder 50.

Effects of Third Embodiment

The projector according to the present embodiment described above provides the effects below as well as the same effects provided by the projector 1 according to the first embodiment.

The light source apparatus 4C includes the afocal optical element 52, which increases the luminous flux diameter of the fluorescence YL emitted from the wavelength converter 63 and parallelizes the light having the increased diameter.

According to the configuration described above, the afocal optical element 52 can increase the luminous flux diameter of the fluorescence YL to be outputted from the light source apparatus 4C. Therefore, when the light source apparatus 4C is so configured that the luminous flux diameter of the illumination light WL outputted from the light source apparatus 4C is equal to the luminous flux diameter of the illumination light WL outputted from the light source apparatus without the afocal optical element 52, the afocal optical element 52 allows reduction in the sizes of the parts upstream thereof in the optical paths of the blue light and the fluorescence out of the parts that form the light source apparatus 4C. The size of the light source apparatus 4C can therefore be reduced.

Variations of Embodiments

The present disclosure is not limited to the embodiments described above, and variations, improvements, and other modifications to the extent that the advantage of the present disclosure is achieved fall within the scope of the present disclosure.

In the embodiments described above, it is assumed that the light source apparatuses 4A, 4B, and 4C each include the light separator 46, which guides part of the blue light outputted from light sources 421 to the wavelength converter 63 and guides the other part of the blue light to the diffuser 49, but not necessarily. The light source apparatuses according to the present disclosure may each be configured to cause the entire blue light outputted from the light sources 421 to enter the wavelength converter 63. In this case, for example, the light source apparatus may be configured to output white light by combining blue light outputted from another light source with the fluorescence YL generated by the wavelength converter 63.

In the embodiments described above, it is assumed that the axis of rotation RX, around which the driver 66 rotates the optical element 61 and the light collector 62 coincides with the first optical axis X1, which is the optical axis of the blue light BLs incident on the optical element 61, but not necessarily. The axis of rotation Rx may not coincide with the first optical axis X1.

In the embodiments described above, it is assumed that the first surface 611 of the optical element 61 inclines with respect to a plane perpendicular to the first optical axis X1, but not necessarily. The first surface of the optical element, the surface on which the first light is incident, may not incline with respect to a plane perpendicular to the first optical axis. That is, the optical element only needs to be capable of changing the traveling direction of the first light incident on the first surface and causing the first light to exit in parallel to the first optical axis via the second surface.

Furthermore, it is assumed that the first surface 611 and the second surface 612 are parallel to each other, but not necessarily. The first surface and the second surface of the optical element may not be parallel to each other.

In the embodiments described above, it is assumed that the axis of rotation Rx, around which the optical element 61 and the light collector 62 are rotated, intersects with the light incident surface 632, at the center thereof, of the wavelength conversion layer 631 provided in the wavelength converter 63, but not necessarily. The axis of rotation around which the optical element and the light collector are rotated may intersect with a portion of the light incident surface, on which the first light is incident, of the wavelength converter, the portion excluding the center of the light incident surface.

In the embodiments described above, it is assumed that the light source apparatuses 4A, 4B, and 4C each include the light separator 46, which reflects the blue light BLs outputted from the light sources 421 to guide the reflected blue light BLs to the wavelength converter 63, but not necessarily. The light separator 46 may be omitted. That is, the wavelength conversion apparatus 6 may be disposed on the illumination optical axis Ax1, and the blue light BLs outputted from the light sources 421 along the illumination optical axis Ax1 may be caused to enter the wavelength conversion apparatus 6. It is further assumed in the embodiments described above that the light separator 46 corresponds to the reflector. However, the reflector in the present disclosure does not necessarily reflect part of the light incident thereon and transmit the other part of the light in accordance with the wavelength or the polarization state of the light and may instead be a total reflection mirror that reflects substantially the entire incident light.

In the second embodiment described above, it is assumed that the light source apparatus 4B includes the afocal optical element 51, and that the afocal optical element 51 is provided on a side of the optical element 61, the side on which the blue light BLs is incident, in the optical path of the blue light BLs to be incident on the wavelength converter 63, reduces the luminous flux diameter of the blue light BLs, and parallelizes the blue light BLs. That is, it is assumed that the light source apparatus 4B includes the afocal optical element 51, and that the light source apparatus 4B is provided between the light separator 46 and the optical element 61, reduces the diameter of the luminous flux incident from the light separator 46 on the optical element 61, and parallelizes the luminous flux having the reduced diameter. The afocal optical element 51 may be so disposed between the optical element 61 and the light collector 62 that the optical axis of the afocal optical element 51 coincides with the second optical axis X2. In this case, the driver 66 may rotate the optical element 61, the light collector 62, and the afocal optical element 51 as a unit around the axis of rotation Rx.

In the embodiments described above, it is assumed that the wavelength converter 63 includes the wavelength conversion layer 631, which converts the blue light BLs into the fluorescence YL, and the reflection layer 633, which reflects the light incident from the wavelength conversion layer 631, but not necessarily. The reflection layer 633 may be omitted. In this case, the substrate 64 may be configured to reflect the light incident from the wavelength conversion layer 631. Furthermore, the wavelength converter 63 may be configured to cause the fluorescence YL to exit along the direction in which the blue light BLs is incident. That is, the wavelength converter in the present disclosure may be a transmissive wavelength converter.

In the embodiments described above, it is assumed that the wavelength conversion apparatus 6 includes the substrate 64 and the heat dissipation member 65, but not necessarily. The substrate 64 may be omitted, and the heat dissipation member 65 may be omitted. Furthermore, the substrate 64 is not necessarily be thermally coupled to the light source enclosure 41.

In the first embodiment described above, it is assumed that the light source apparatus 4A has the configuration and layout shown in FIG. 2. In the second embodiment described above, it is assumed that the light source apparatus 4B has the configuration and layout shown in FIG. 4. In the third embodiment described above, it is assumed that the light source apparatus 4C has the configuration and layout shown in FIG. 5. The configuration and layout of any of the light source apparatuses according to the present disclosure are, however, not limited to the those described above. The same holds true for the projector including any of the light source apparatuses according to the present disclosure.

In the embodiments described above, the light modulation apparatuses 34 include the three light modulators 34B, 34G, and 34R, but not necessarily. The number of light modulators that form the light modulation apparatuses is not limited to three and can be changed as appropriate.

It is further assumed in the embodiments described above that the light modulators 34B, 34G, and 34R include each a transmissive liquid crystal panel having a light incident surface and a light exiting surface different from each other, but not necessarily. The light modulators may each include a reflective liquid crystal panel having a surface that serves both as the light incident surface and the light exiting surface. Still instead, the light modulators 34B, 34G, and 34R may each be a light modulator using any component other than a liquid-crystal-based component if the modulators can modulate an incident luminous flux to form an image according to image information, such as a device using micromirrors, for example, a digital micromirror device (DMD).

The aforementioned embodiments have been described with reference to the case where the light source apparatuses according to the present disclosure are each incorporated in a projector, but not necessarily. The light source apparatuses according to the present disclosure may each be used in an electronic instrument other than a projector, for example, an illuminator and a headlight of an automobile.

Overview of Present Disclosure

The present disclosure will be summarized below as additional remarks.

A light source apparatus according to a first aspect of the present disclosure includes a light source that outputs first light having a first wavelength band, a wavelength converter that converts the first light into second light having a second wavelength band different from the first wavelength band, a substrate that supports the wavelength converter, an optical element provided in the optical path of the first light outputted from the light source and incident on the wavelength converter, a light collector that collects the first light having exited out of the optical element at the wavelength converter, and a driver that rotates the optical element and the light collector around an axis of rotation parallel to a first optical axis of the first light incident on the optical element. The wavelength converter has a light incident surface on which the first light is incident. The optical element has a first surface on which the first light is incident and a second surface via which the first light exits toward the light collector. A light incident position on the first surface, the position on which the first light is incident, is present on the first optical axis. A light exiting position on the second surface, the position from which the first light exits, and the focal point of the light collector are present on a second optical axis parallel to the first optical axis. The first optical axis and the second optical axis are separate from each other at the light incident surface.

According to the configuration described above, the driver can rotate the optical element and the light collector around the axis of rotation to move the light incident position, where the first light is incident on the intersection where the second optical axis intersects with the light incident surface of the wavelength converter. In this process, the focal point of the light collector is present on the second optical axis, so that the first light is focused at the intersection where the second optical axis intersects with the wavelength converter. The range over which the first light is incident on the incident surface can therefore be reduced, whereby the range over which the second light is emitted from the wavelength converter can be reduced. In addition to the above, since continuous local incidence of the first light on the wavelength converter can be avoided, whereby the situation in which the temperature of the wavelength converter locally rises can be suppressed. A decrease in the efficiency at which the wavelength converter converts the first light into the second light can therefore be suppressed, whereby the efficiency at which the second light is extracted from the wavelength converter can be increased.

In the first aspect described above, the axis of rotation may coincide with the first optical axis.

Consider now a case where the axis of rotation around which the optical element and the light collector are rotated does not coincide with the first optical axis. When the optical element and the light collector are rotated by the driver, the trajectory of the light incident position where the first light is incident on the light incident surface is located outside the trajectory, around the axis of rotation, of the portion where the first optical axis intersects with the light incident surface. That is, the trajectory of the light incident position is concentric with and disposed outside the trajectory of the portion where the first optical axis intersects with the light incident surface. In this case, since the trajectory of the light incident position of the first light has a relatively large diameter, the wavelength converter tends to be large to avoid loss of the first light incident on the wavelength converter.

In contrast, when the axis of rotation coincides with the first optical axis, the diameter of the trajectory of the light incident position where the first light is incident on the light incident surface can be smaller than the diameter in the case where the axis of rotation does not coincide with the first optical axis. The size of the wavelength converter can therefore be reduced.

In the first aspect described above, the first surface may incline with respect to a plane perpendicular to the first optical axis, and the first surface and the second surface may be parallel to each other.

According to the configuration described above, the first light incident on the first surface can be refracted by the optical element. The light incident position where the first light is incident on the light incident surface can therefore be changed when the driver rotates the optical element and the light collector.

Furthermore, since the first surface and the second surface are parallel to each other, the position from which the first light exits via the second surface can be readily grasped. The light collector, the focal point of which is located on the second optical axis, can therefore be readily disposed.

In the first aspect described above, the light source apparatus may include an afocal optical element provided in the optical path of the first light incident on the wavelength converter and on a side of the optical element, the side on which the first light is incident, the afocal optical element reducing the luminous flux diameter of the first light and parallelizing the first light.

According to the configuration described above, the afocal optical element can reduce the luminous flux diameter of the first light to be incident on the optical element. The sizes of the optical element, the light collector, and the wavelength converter can thus be reduced. The size of the light source apparatus can therefore be reduced.

In the first aspect described above, the light source apparatus may include an afocal optical element that increases the luminous flux diameter of the second light emitted from the wavelength converter and parallelizes the second light having the increased diameter.

According to the configuration described above, the afocal optical element can increase the luminous flux diameter of the second light to be outputted from the light source apparatus. Therefore, when the light source apparatus including the afocal optical element is so configured that the diameter of the luminous flux outputted from a light source apparatus including no afocal optical element is equal to the diameter of the luminous flux outputted from a light source apparatus including an afocal optical element, the afocal optical element allows reduction in the sizes of the parts upstream thereof in the optical paths of the first light and the second light out of the parts that form the light source apparatus. The size of the light source apparatus can therefore be reduced.

A projector according to a second aspect of the present disclosure includes the light source apparatus according to the first aspect described above, a light modulation apparatus that modulates illumination light outputted from the light source apparatus to form an image, and a projection optical apparatus that projects the image formed by the light modulation apparatus.

The configuration described above can provide the same effects as those provided by the light source apparatus according to the first aspect.

What is claimed is:

1. A light source apparatus comprising:
a light source configured to emit first light having a first wavelength band;
a wavelength converter configured to convert the first light into second light having a second wavelength band different from the first wavelength band;
a substrate supporting the wavelength converter;
an optical element disposed in an optical path of the first light to be incident on the wavelength converter;
a light collector configured to collect the first light emitted from the optical element toward the wavelength converter; and
a driver configured to rotate the optical element and the light collector around a rotation axis parallel to a first optical axis of the first light incident on the optical element,
wherein the optical element has a first surface on which the first light is incident along the first optical axis and a second surface via which the first light exits toward the light collector along a second optical axis,
the first light emitted from the light collector is incident on the wavelength converter along the second optical axis, and
the first optical axis and the second optical axis are shifted from each other.

2. The light source apparatus according to claim 1, wherein the rotation axis coincides with the first optical axis.

3. The light source apparatus according to claim 1, wherein the first surface and the second surface each incline with respect to a plane perpendicular to the first optical axis, and
the first surface and the second surface are parallel to each other.

4. The light source apparatus according to claim 1, wherein the optical element refracts the first light incident along the first optical axis and causes the first light to exit along the second optical axis.

5. The light source apparatus according to claim 1, wherein the optical element refracts the second light incident along the second optical axis and emit the second light along the first optical axis.

6. The light source apparatus according to claim 1, wherein the wavelength converter has a light incident surface on which the first light is incident, and
a light incident area of the light incident surface has an annular shape around the rotation axis.

7. The light source apparatus according to claim 1, wherein the first optical axis and the second optical axis are parallel to each other.

8. The light source apparatus according to claim 1, further comprising
an afocal optical element disposed in the optical path of the first light and disposed on a light incident side of the optical element, the afocal optical element being configured to reduce a luminous flux diameter of the first light and parallelizes the first light.

9. The light source apparatus according to claim 1, further comprising
an afocal optical element disposed in a optical path of the second light and disposed on a light exiting side of the optical element, the afocal optical element being configured to increase a luminous flux diameter of the second light and parallelizes the second light.

10. A projector comprising:
the light source apparatus according to claim 1;
a light modulator configured to modulate light emitted from the light source apparatus; and
a projection optical apparatus configured to project the light modulated by the light modulator.

* * * * *